United States Patent Office 3,240,792
Patented Mar. 15, 1966

3,240,792
TETRAFLUOROPHTHALIC ACIDS AND
DERIVATIVES
Colin Russell Patrick and John Colin Tatlow, Birmingham, England, assignors to Imperial Smelting Corporation (N.S.C.) Limited, London, England, a British company
No Drawing. Filed Feb. 25, 1965, Ser. No. 435,376
5 Claims. (Cl. 260—346.3)

This application is a continuation-in-part of an earlier application Serial No. 181,471, filed on March 21, 1962, now abandoned.

This invention relates to fluorinated aromatic dicarboxylic acids and derivatives thereof and to a process for the preparation of these compounds.

Highly fluorinated aromatic compounds are valuable as synthetic intermediates for the production of polymers, pharmaceuticals, dyestuffs, heat-exchange fluids, dielectric liquids and specialised solvents. The compounds of the invention are key intermediates for some of these purposes, as will be set forth in more detail below.

The invention has as its main object the provision of three novel compounds:

(1) Tetrafluorophthalic acid, o-$C_6F_4(COOH)_2$
(2) Tetrafluoro-isophthalic acid, m-$C_6F_4(COOH)_2$
(3) Tetrafluoro-terephthalic acid, p-$C_6F_4(COOH)_2$ Examples will be given below to show how these acids can be used to prepare:

Dimethyl tetrafluoroterephthalate p-$C_6F_4(COOCH_3)_2$
Tetrafluorophthalic anhydride

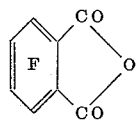

3,4,5,6-tetrafluorophthalimide

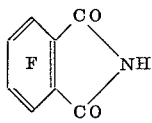

3,4,5,6-tetrafluoroanthranilic acid

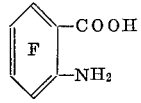

1,2,3,4-tetrafluorobenzene, and
1,2,4,5-tetrafluorobenzene

A further object of the invention is to provide a method of preparing a tetrafluorophenyl dicarboxylic acid, which method includes the step of subjecting a perfluoroxylene to hydrolysis with a strong acid. Conveniently, this hydrolysis can be carried out using fuming sulfuric acid. Temperatures in the range 100°–200° C. are preferred for carrying out the hydrolysis and a temperature around 150° C. can conveniently be used.

The perfluoroxylenes, which are used as the starting materials in the process according to the invention, are best prepared by passing a perfluoro(dimethylcyclohexane) over a heated metal such as iron or nickel at a temperature in the range 300° C. to 600° C. as described in U.S.P. 3,000,976. Defluorination of perfluoro(1,2-dimethylcyclohexane) yields decafluoro-o-xylene and defluorination of the corresponding 1,3- and 1,4-compounds yields the meta- and para-xylenes respectively.

A general object of this invention is the preparation of fluorinated carboxylic acids and their derivates from readily-available organic starting materials and a process is envisaged comprising the steps of:

(i) Fluorinating a xylene using cobalt trifluoride at 300°–350° C.
(ii) Separating the perfluoro(dimethyl - cyclohexane) formed,
(iii) Passing the said perfluoro(dimethylcyclohexane) over heated iron at 450°–500° C. to form a perfluoroxylene, and
(iv) Subjecting the said perfluoroxylene to hydrolysis with a strong acid.

One of the valuable characteristics of the new acids is the fact that they can be readily decarboxycated to give valuable fluorocarbon products whose uses are described below. Thus 1,2,3,4- and 1,2,4,5-tetrafluorobenzene are prepared by heating tetrafluorophthalic acid and tetrafluoroterephthalic acid respectively with soda lime and collecting the tetrafluorobenzene produced.

The present invention provides new tetrafluoroaromatic compounds, e.g., acids, anhydrides, fluorocarbons, etc. Although there is a structural similarity between these and the corresponding unfluorinated compounds, it could not be foreseen that the methods used would give the desired compounds in high yield and certain chemical evidence pointed in the other direction. Thus the prior art discloses that the preparation of $C_6F_5COOH$ from $C_6F_5.CF_3$ by hydrolysis with concentrated sulphuric acid proceeds in low yield and at a slow rate (J. Amer. Chem. Soc. 73, 1366 (1951)). In contrast, the hydrolysis reaction of the invention proceeds rapidly and high yields of the tetrafluoroaromatic dicarboxylic acids are obtained.

As is well known, the reactions of highly-fluorinated aromatic compounds are unpredictable and these compounds show differences from the reactions of other aromatic compounds.

Examples of such anomalous reactions are:

(a) $C_6F_5SO_3H$ is unstable and decomposes on storage. (J. Chem. Soc. (1959), 166) whereas $C_6H_5SO_3H$ is a stable and widely-used chemical intermediate,
(b) Halogenation of $C_6F_5H$ does not proceed under the mild conditions which are successfully used in the case of $C_6H_6$ (ibid.),
(c) The diazonium salt of pentafluoroaniline (Chem. and Ind. (1958), 630) gives anomalous reactions,
(d) Carbonation of $C_6F_5MgBr$ in ether proceeds in extremely poor yield (Nield, Stephens and Tatlow, J.C.S (1959), 166) and the same Grignard does not react with ethylene oxide in ether solution (Tetrahedron, 47, p. 3575),
(e) $C_6F_5.CH_3$ cannot be oxidised to $C_6F_5.COOH$ except in very low yield. (Birchall and Haszeldine J.C.S., 1961, p. 3719.)

The tetrafluorophenyl dicarboxylic acids are crystalline solids. They undergo chemical reactions such as esterification upon heating the acid with an alcohol, formation of acid chlorides when the acid is treated with phosphorous pentachloride, and tetrafluorophthalic acid forms an anhydride which reacts with ammonia to form tetrafluorophthalimide. Thus the compounds of the invention are useful intermediates for the production of such compounds as esters which are heat-stable and radiation-stable fluids. Further, polymers are prepared by reacting the acid chlorides with a diamine, e.g. tetrafluoro-p-phenylene diamine, and these novel products are useful as heat-transfer media, dielectrics, etc. In addition, tetrafluoroterephthalic acid, when condensed with glycols, forms polymers which are new members of a known class, typified by e.g. Dacron, Terylene (registered trademarks). However, by virtue of containing a fluorinated aromatic nucleus these new polymers have different heat-resistant characteristics from the known polymers, as does polytetrafluoroethylene when compared with ethylene.

An important use for the unfluorinated anthranilic acid and for phthalic anhydride is in the preparation of dyestuffs (phenolphthalein, fluoresceins, rhodamine dyes, etc.). The compounds provided by the present invention can also be elaborated into dyestuffs of these classes which contain fluorinated aromatic rings and thus they constitute valuable intermediates. Such reactions are set out in detail in Schmidt, Organic Chemistry, 6th edition, pp. 488 et. seq.

The tetrafluorobenzenes are useful intermediates for the production of $C_6F_4$-compounds generally and in themselves constitute heat-transfer or hydraulic fluids or dielectric liquids.

The invention will be further described with reference to the following examples:

EXAMPLE 1

Preparation of perfluoro-O-xylene

Perfluoro-1,2-dimethylcyclohexane (9 g.) was passed in a stream of nitrogen flowing at 2 l./hr. through the defluorination tube which was heated to 460° C. The product (6 g.) was separated by preparative-scale gas chromatography to give starting material (3.1 g.) and perfluoro-o-xylene (1.8 g.) B.P. 128°, $n_D^{19}$ 1.3670 (found: C, 33.2; F, 66.2. $C_8F_{10}$ requires C, 33.6; F, 66.4%). Mass spectrometry (principal mass peaks): 286, $C_8F_{10}$; $C_8F_9$; 217, $C_7F_7$. Light absorption in ethanol (c., 0.085 g./l.); max. 2720 ($\epsilon$=1753).

EXAMPLE 2

Preparation of perfluoro-P-xylene

Perfluoro-1,4-dimethylcyclohexane (9.0 g.) was treated as described above (reactor temperature 460° C.). The product (6.0. g.), separated as before, gave starting material (3.5 g.) and perfluoro-p-xylene (1.65 g.), B.P. 122°, $n_D^{17}$ 1.3621 (found: C, 33.9; F, 66.3%). Light absorption in ethanol (c., 0.047 g./l.); max. 2850 ($\epsilon$=2590).

An object of the invention is to provide new acids from these xylenes.

EXAMPLE 3

Preparation of tetrafluorophthalic acid

Perfluoro-o-xylene (6.4 g.) and fuming sulphuric acid (20% sulphur trioxide; 4 ml.) were heated at 150° and shaken in a sealed tube for 12 hr. The tube was cooled in liquid air, then opened, and its contents were poured on ice. The resulting solution was made alkaline, extracted with ether and acidified. The acid solution was extracted continuously with ether for 12 hr. and the extract was decolorised (charcoal), dried ($MgSO_4$), and evaporated to leave a white solid (5.8 g.), M.P. 151–153°, which was re-crystallised from o-xylene to give tetrafluorophthalic acid (5.0 g.), M.P. 153–154° (found: C, 40.3; H, 1.0; 31.6%; equiv., 117. $C_8H_2F_4O_4$ requires C, 40.3; H, 0.8; F, 31.9%; equiv., 119). The infra-red spectrum showed a strong band at 1735 cm.$^{-1}$ (C—O).

The acid (0.3 g.) gave in the usual way di-(S-benzylthiouronium) tetrafluorophthalate (0.2 g.), M.P. 205° (decomp.) (from water) (found: C, 50. 8; H, 4.0 F, 13.4. $C_{24}H_{22}F_4N_4O_4S_2$ requires C, 50.5; H, 3.9; F, 13.3%). Treatment of the acid (0.2 g.) with an excess of aniline in ether gave anilinium hydrogen tetrafluorophthalate (0.2 g.), M.P. 204–205° (decomp.) from acetone-chloroform (found: C, 50.8; H, 2.9. $C_{14}H_9F_4NO_4$ requires C, 50.8; H, 2.7%). As an example of a further derivative, a solution of tetrafluorophthalic acid (5.5 g.) in water (20 ml.) was neutralised with aqueous sodium carbonate. A solution of silver nitrate (20 g.) in water (50 ml.) was added and the precipitated disilver salt (9.5 g.) filtered off (found: C, 21.4. $C_8Ag_2F_4O_4$ requires C, 21.2%).

EXAMPLE 4

Tetrafluorophthalic anhydride

Tetrafluorophthalic acid (2.4 g.) was refluxed with trifluoroacetic anhydride (5 ml.) for 2 hr. Trifluoroacetic acid and trifluoroacetic anhydride were removed by distillation under reduced pressure, and the residue was sublimed at 80°/0.05 mm., to yield tetrafluorophthalic anhydride (2.0 g.), M.P. 94–95.5° (found: C, 43.4%; equiv., 110. $C_8F_4O_3$ requires C, 43.6%; equiv., 110). The infra-red spectrum showed a band at 1805 cm.$^{-1}$ (C—O).

EXAMPLE 5

Tetrafluorophthalimide

The temperature of a mixture of tetrafluorophthalic anhydride (2.5 g.) and aqueous ammonia (d. 0.88; 3 ml.) was gradually increased to 280° during 1 hr. The solid product (2.5 g.) sublimed at 120°/0.05 mm., to give tetrafluorophthalimide (1.5 g.), M.P. 210–211° (found: C, 44.2; H, 0.8; F, 34.5. $C_8HF_4NO_2$ requires C, 43.8; H, 0.5 F, 34.7%).

This imide (0.3 g.) was added to a solution of xanthhydrol (0.3 g.) in glacial acetic acid (3 ml.) and heated in a boiling water bath for 30 minutes. The precipitate was re-crystallised from dioxan-water (3.2) to give the xanthhydrol derivative (0.15 g.) M.P. 255–256° (found: C, 63.3; H. 2.3. $C_{21}H_9F_4O_3N$ requires C, 63.2; H, 2.3%).

EXAMPLE 6

Preparation of 3,4,5,6-tetrafluoroanthranilic acid

To a cooled solution of sodium hydroxide (1.7 g.) and bromine (1.3 g.) in water (10 ml.) was added finely powdered tetrafluorophthalimide (1.7 g.). A solution of sodium hydroxide (1.1 g.) in water (5 ml.) was added rapidly and the resulting solution heated to 80° for 1 minute and then cooled to 15°. The solution was acidified with concentrated hydrochloric acid, and the resulting precipitate (1.0 g), M.P. 135–139°, removed by filtration. Reprecipitation from alkaline solution and recrystallisation from water gave 3,4,5,6-tetrafluoroanthranilic acid (0.5 g.), M.P. 141–142° (found: C, 40.5; H, 1.6. $C_7H_3F_4NO_2$ requires C, 40.2; H, 1.4%). The infra-red spectrum showed bands at 1675 (C—O), 3400, 3620 (N—H), and 3000 cm.$^{-1}$ broad (O—H).

The acid (0.2 g.) gave in the usual way S-benzylthiouronium 3,4,5,6-tetrafluoroanthranilate (0.15 g.), M.P. 205° (found: C, 48.2; H, 3.7. $C_{15}H_{13}F_4N_3O_2S$ requires C, 48.0; H, 3.5%).

EXAMPLE 7

Tetrafluoroterephthalic acid

Perfluoro-p-xylene (6.0 g.) was treated with concentrated sulphuric acid (6 ml.) as for its isomer: Recrystallisation from water of the solid obtained gave tetrafluoroterephthalic acid (4.0 g.), M.P. 283–284° (found: C, 40.2; H, 0.7; F, 31.5%), max. 1725 cm.$^{-1}$ (C=O).

The acid (0.2 g.) gave a di-(S-benzylthiouronium) salt (0.3 g.), M.P. 211–212° (found: C, 50.7; H, 4.1%).

With aniline in ether the acid (0.26 g.) afforded a dianilium salt (0.20 g) (from acetone-chloroform), M.P. 205° (decomp.) (found: C, 56.6; H, 3.6. $C_{20}H_{16}F_4N_2O_4$ requires C, 56.6; H, 3.8%).

EXAMPLE 8

Dimethyltetrafluoroterephthalate

The acid (1.1 g.) and concentrated sulphuric acid (1.0 ml.) were refluxed for 5 hr. in methanol (10 ml.). When cooled the precipitate which formed was filtered off and recrystallised from methanol to give dimethyltetrafluoroterephthalate (0.7 g.), M.P. 79.80° (found: C, 45.4; H, 2.0. $C_{10}H_6F_4O_4$ requires C, 45.1; H, 2.3%).

EXAMPLE 9

*Decarboxylations of the tetrafluorophthalic acids*

Tetrafluorophthalic acid (0.43 g.) and soda-lime (1.0 g.) were mixed intimately and the temperature increased gradually to 300° C. The distillate (0.20 g.) was shown by infra-red spectroscopy to be 1,2,3,4-tetrafluorobenzene.

In an analogous fashion, tetrafluoroterephthalic acid (0.51 g.) afforded 1,2,4,5-tetrafluorobenzene (0.22 g.) with a correct infra-red spectrum.

EXAMPLE 10

*Hydrolysis of decafluoro-m-xylene to tetrafluoro-isophthalic acid*

Decafluoro-m-xylene (50 g.) and 20% oleum (40 ml.) were shaken in a 100 ml. flask at 150° C. for 12 hours. On cooling, the product was poured into ice. The aqueous solution obtained was continuously extracted with ether for 12 hours. The ether was distilled off leaving crude tetrafluoro-iso-phthalic acid (37.3 g.) 90%; M.P. 210° C. Several recrystallisations from nitrobenzene gave a purified product with M.P. 218° C.–220° C. Infra-red confirmed the presence of a fluorinated aromatic nucleus and carboxyl groups (found: C, 40.3%; H, 0.9%; F, 31.0%. $C_8H_2F_4O_4$ requires C, 40.3%; H, 0.8%; F, 31.9%).

Note.—The melting points of the other two isomers were as follows:

| | ° C. |
|---|---|
| Tetrafluorophthalic acid | 153–154 |
| Tetrafluoroterephthalic acid | 283–284 |

Various modifications may be made within the scope of the invention.

We claim:
1. Tetrafluorophthalic acid, o-$C_6F_4(COOH)_2$.
2. Tetrafluoroisophthalic acid, m-$C_6F_4(COOH)_2$.
3. Tetrafluoroterephthalic acid, p-$C_6F_4(COOH)_2$.
4. Dimethyltetrafluorophthalate, p-$C_6F_4(COOCH_3)_2$.
5. Tetrafluorophthalic anhydride, o-$C_6F_4$—$(CO)_2O$.

References Cited by the Examiner

Gething et al.: Nature, volume 183 (1959), pages 588–89.

Haszeldine et al.: J. Chem. Soc., London (1950), pages 3617–23.

Le Fave: J. Amer. Chem. Soc., volume 71 (1949), page 4148.

McBee et al.: J. Amer. Chem. Soc., volume 73 (1951), pages 1366–67.

NICHOLAS S. RIZZO, *Primary Examiner.*

HENRY R. JILES, *Assistant Examiner.*